Oct. 4, 1932.  F. R. TOMLINSON  1,880,581
VALVE
Filed Nov. 4, 1927   2 Sheets-Sheet 1
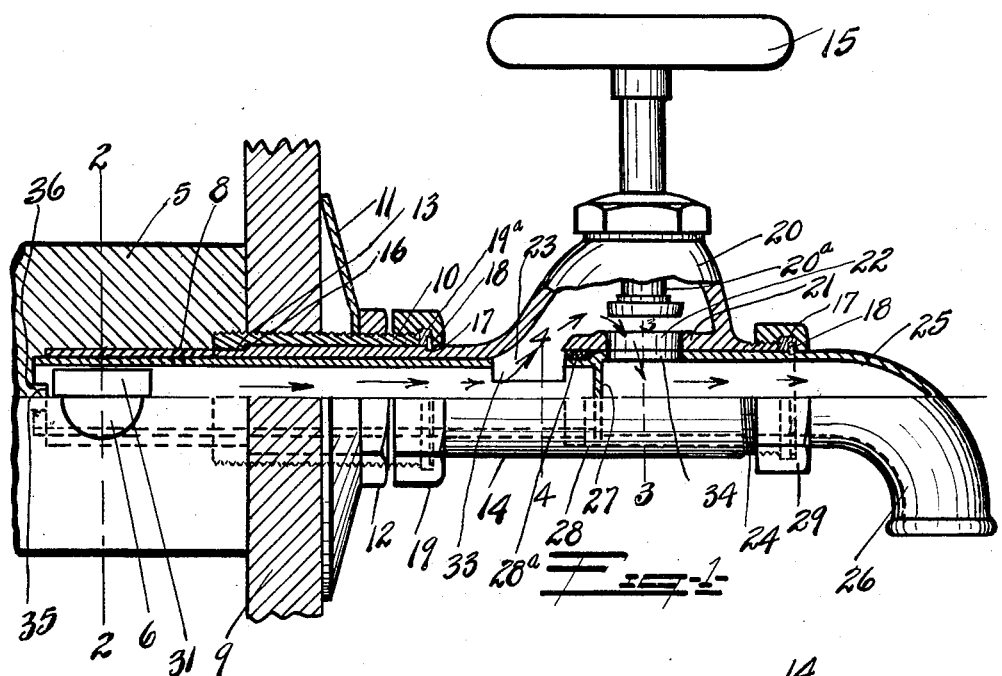
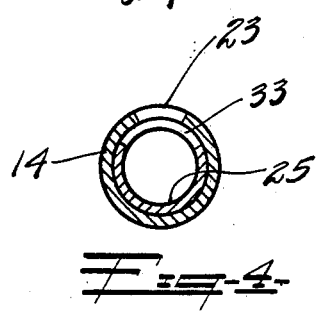
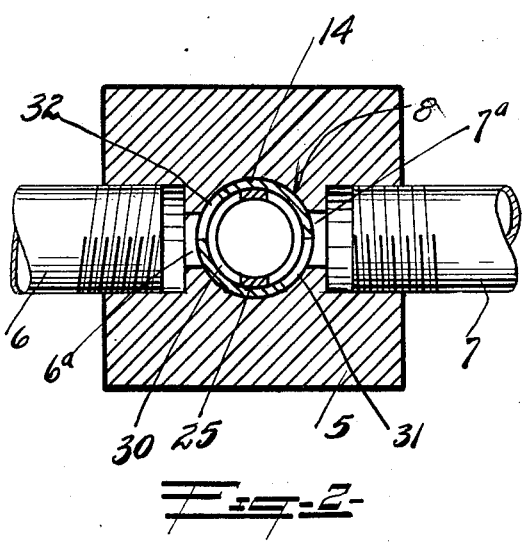
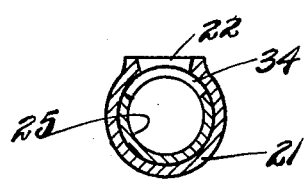
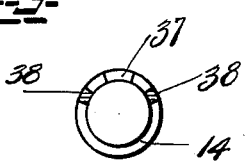
INVENTOR.
*Frank R. Tomlinson.*
BY *Frank C. Karman.*
ATTORNEY.

Oct. 4, 1932.　　　F. R. TOMLINSON　　　1,880,581
VALVE
Filed Nov. 4, 1927　　2 Sheets-Sheet 2
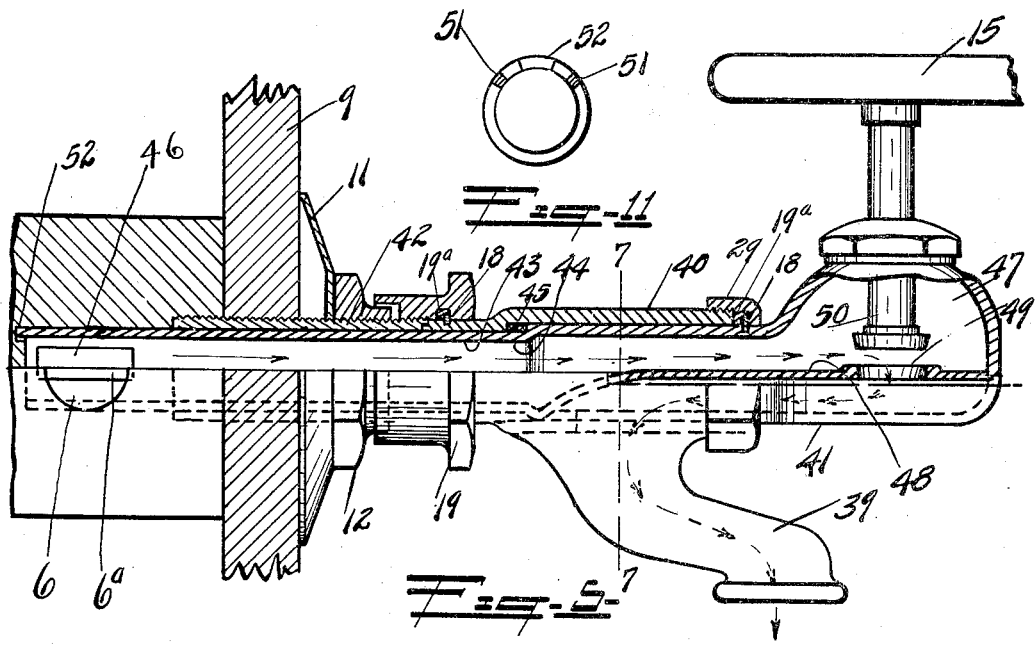
INVENTOR.
BY Frank R. Tomlinson.
Frank C. Harman
ATTORNEY.

Patented Oct. 4, 1932

1,880,581

UNITED STATES PATENT OFFICE

FRANK R. TOMLINSON, OF BAY CITY, MICHIGAN

VALVE

Application filed November 4, 1927. Serial No. 231,004.

This invention relates to mixing valves, and particularly to a valve for use in connection with hot and cold water connections, for regulating the flow of the liquid and the temperature thereof.

The prime object of the invention is to provide a mixing valve wherein hot and cold water may be admitted and mixed in suitable proportions, so that water of the desired temperature may be drawn from the faucet.

Another object is to design a valve by means of which either hot or cold water may be discharged from the faucet, or water of any temperature, (caused by mixing hot and cold water together in proper proportions) may be secured by use of but one valve or faucet.

A further object is to design a simple, substantial, and economical mixing valve for general use in dwellings, office, and factory buildings, or in any place where it is desirable to provide water at different temperatures to suit the user.

With the above and other objects in view, the present invention consists in the combination and arrangement of parts, hereinafter more fully described, illustrated in the accompanying drawings, and particularly pointed out in the appended claims, it being understood that changes may be made in the form, size, proportion and minor details of construction, without departing from the spirit, or sacrificing any of the advantages of the invention.

In the drawings.

Fig. 1 is a part sectional side view of my improved mixing valve.

Fig. 2 is a transverse sectional view of the mixing chamber taken on the line 2—2 of Fig. 1.

Fig. 3 is a transverse sectional view taken on the line 3—3 of Fig. 1.

Fig. 4 is also a transverse sectional view taken on the line 4—4 of Fig. 1.

Fig. 5 is a part sectional side view showing an alternate construction.

Fig. 6 is a front view of the mixing chamber.

Fig. 7 is a transverse sectional view taken on the line 7—7 of Fig. 5.

Fig. 8 is a front view of the valve, the full lines indicating the position of the valve when discharging water of medium temperature, the dotted lines indicating the position when discharging hot and cold water.

Fig. 9 is a fragmentary side view showing the spring washer in place.

Fig. 10 is a transverse sectional end view of Fig. 9.

Fig. 11 is an end view of the inner sleeve showing the stop and lugs.

Fig. 12 is also an end view of the inner rotatable sleeve shown in Fig. 5, the position of the lugs or stops being indicated in section.

From the sanitary view point it is of course desirable, that the water be taken directly from the faucet, instead of first filling a basin, and then using from said basin, consequently, it is therefore necessary that the water discharging from the faucet be of the proper temperature, and where but one valve or faucet is used, it obviously must be necessary to have the proper mixture of hot and cold water before it discharges from the faucet. My improved mixing valve construction permits of such mixing, as well as providing for a complete cut off of either the hot or cold water supply.

Referring now particularly to the drawings in which I have shown the preferred embodiment of my invention, the numeral 5 indicates a mixing chamber which is provided with hot and cold water inlet connections 6 and 7 respectively, leading to and opening into a centrally disposed passage 8 formed in said mixing chamber through slotted openings 6ª and 7ª respectively.

The mixing chamber is placed against the back of a conventional sink 9, and a pipe nipple 10 is threaded into the mixing chamber, projecting through the wall of the sink, and having a washer 11 mounted thereon, said washer being held in place by means of a nut 12, the inner end of the nipple opening being reduced by means of a shoulder 13, and for a purpose to be presently described.

The body portion of the valve proper is indicated by the numeral 14, and is provided with a handle 15 which can be self closing or hand actuated, the inner end of this body portion extending rearwardly and is rotatably mounted in the nipple member 10, the end being shouldered as shown at 16 to fit the reduced end of the nipple, a groove 17 being provided in the body portion intermediate its length, and a spring washer 18 is mounted therein, said washer being reduced within a packing nut 19 which is mounted on said body portion and has threaded engagement with the end of the nipple 10, a suitable packing 19ª being interposed between the end of the nipple and the spring washer and forming a tight water-proof joint, and also preventing longitudinal movement of the body portion in the nipple, through instrumentality of the spring washer 18.

The outer end of the body portion has an enlarged vertical disposed housing 20, in which the valve stem 20ª is mounted in the usual manner, the lower end of said housing being cylindrical in shape as shown at 21, and is provided with a port or passage 22, adapted to be closed by manipulation of the valve stem in the usual manner, a similar passage 23 leading from the main body of the housing, the outer end of the housing body being reduced and threaded as shown at 24.

An inner sleeve 25 is mounted in this body member 14, the outer end being formed with a bib 26, and a solid division wall 27 is provided in the sleeve as shown, said sleeve being reduced at the point 28 to form a shoulder and seat for a packing 28ª, thence projecting through the main body, and into the centrally disposed passage in the mixing chamber, a circumferential groove 17 (similar to that above described) is provided directly adjacent the neck of the bib, and a washer and packing nut assembly 29 is provided and engages the threaded ends of the main body for holding the sleeve in position, thereby providing a tight joint so that the main body may be rotated on the sleeve for admitting hot and cold water in unequal proportions so that the water discharging will be of suitable temperature.

Large openings 30 are provided directly adjacent the inner end of the sleeve 25, and a pair of spaced apart openings 32 and 31 respectively are provided in the main body in alinement with the hot and cold water inlet openings 6ª and 7ª respectively, and it will be clearly obvious that when the main body is rotated, that the area of the ports or openings will be varied accordingly, to admit hot and cold water in unequal proportions, or completely shut off and close either the hot or cold water port.

An opening 33 is provided in the sleeve intermediate its length, and in direct alinement with the opening 23 in the main body, so that the water is admitted to the housing, the opening being so shaped and of a size to register with the opening 23 at all times, and regardless of the position of the main body, the water flowing from the housing through the opening 22, and back into the inner stationary sleeve through an opening 34 provided therein, and which must be of a size equal to the opening 33, so that a clear opening is provided at all times, these openings comprising a by-pass from the stationary member into the movable member, and back to the stationary member, the valve being interposed in said by-pass for regulating the flow in the usual manner.

The inner end of the sleeve 25 is notched as shown at 35, and lugs 36 are provided in the mixing chamber to prevent rotation thereof, suitable lugs 37 are provided on the outer sleeve and in certain predetermined positions engage with lugs 38 formed integral with the mixing chamber and form a stop to limit rotation of the main body as clearly shown in Fig. 12 of the drawings.

The structure shown in the Fig. 5 of the drawings is on the same general principles, in this construction the bib 39 is cast integral with an outer sleeve 40 which is mounted on the main body member 41, the outer end having a packing nut assembly to form a water proof joint, and a washer for preventing longitudinal movement of the main body with relation to the outer sleeve, the inner of said outer sleeve interlocking with an externally threaded sleeve 42, and a similar packing nut assembly is provided to secure and form a water proof joint thereat.

An inner sleeve member 43 is formed integral with the main body, being reduced at 44 to accommodate a packing 45, the inner end projecting into the mixing chamber, and is provided with slotted openings 46, similar to those shown in Patent #1,594,648 granted to me under date of August 3, 1926.

An enlarged housing 47 is cast integral with the member 41, and a horizontally disposed division wall 48 is cast in the member 43, an opening 49 being provided therein, and is controlled by a valve 50 in the usual manner, the water following the course as indicated by the numerous arrows.

Outwardly projecting ears 51 are provided on the interior of the mixing chamber, in the construction shown in Fig. 5, and a lug 52 is provided on the inner sleeve, the lugs forming stops to limit the rotation of the valve, and as clearly shown in Fig. 11, of the drawings.

From the foregoing description it will be obvious that I have perfected a simple, economical, and convenient valve by means of which either hot or cold water, or water of varied temperatures can be secured with but one valve or faucet.

What I claim is:—

1. In a device of the character described, a mixing chamber having hot and cold water ports, a stationary member mounted in said chamber, a rotatable member mounted on said stationary member and controlling the area of said ports, a by-pass from said stationary member to said movable member, means for controlling the discharge of water from the stationary member, and stops for limiting the rotation of said rotatable member.

2. In a device of the character described, a mixing chamber having a centrally disposed passage, hot and cold water ports opening thereinto, a stationary member mounted therein, a rotatable member mounted on said stationary member and controlling the area of said ports, means for preventing longitudinal movement of the stationary member with relation to the rotatable member, a by-pass from said stationary member to the rotatable member, means for controlling said by-pass, means for controlling the discharge of water from the stationary member and means for limiting the rotation of said rotatable member.

3. In a device of the character described, a mixing chamber having hot and cold water ports, a stationary member mounted in said chamber, a rotatable member for controlling the area of said ports, a by-pass from said stationary member to the rotatable member, means for controlling said by-pass, and means for limiting the rotation of the rotatable member.

4. In a device of the character described, a mixing chamber, hot and cold water ports opening thereinto, stationary and movable members mounted in said chamber and communicating with said ports, a by-pass from said stationary member to said rotatable member, the movable member controlling the admission of water to the stationary member.

5. In a device of the character described, a mixing chamber having hot and cold water ports, a stationary member, a rotatable member mounted thereon and controlling the area of said ports, a by-pass from said stationary member to said rotatable member, and means for controlling said by-pass.

6. In a device of the character described, a mixing chamber having hot and cold water inlet ports, a stationary tubular member mounted therein, a transversely disposed partition in said member, a revolvable member mounted thereon and controlling the area of said ports, a by-pass around said partition, and means for controlling said by-pass.

7. In a device of the character described, a mixing chamber having a centrally disposed bore, oppositely disposed inlet ports opening thereinto, a stationary member mounted in said bore and having a partition intermediate its length, a rotatable member mounted thereon and controlling the area of said ports, a by-pass around said partition, and adjustable means for controlling said by-pass.

In testimony whereof I hereunto affix my signature.

FRANK R. TOMLINSON.